Jan. 20, 1931.     F. W. KRONE     1,789,761
TIRE STRUCTURE
Filed July 12, 1928
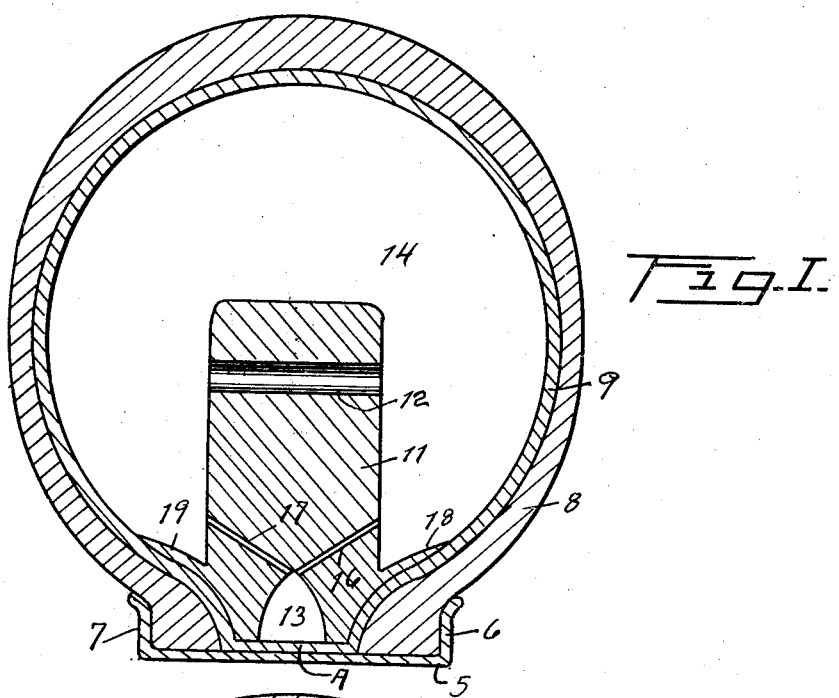
Fig. I.
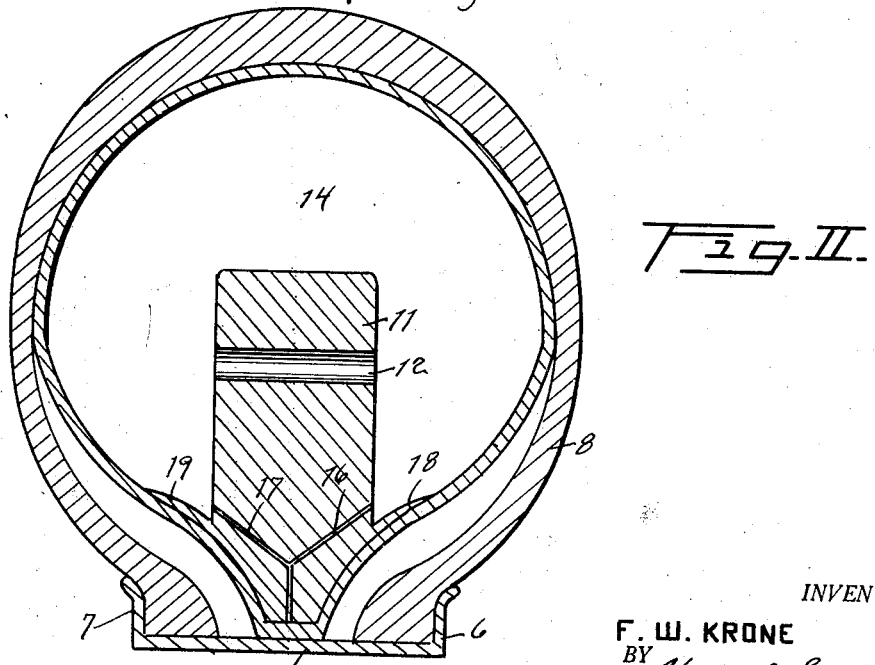
Fig. II.
INVENTOR.
F. W. KRONE
BY
Victor J. Evans
ATTORNEYS.

Patented Jan. 20, 1931

1,789,761

UNITED STATES PATENT OFFICE

FREDERICK W. KRONE, OF SAN FRANCISCO, CALIFORNIA

TIRE STRUCTURE

Application filed July 12, 1928. Serial No. 292,100.

This invention relates to improvements in tire structures and has particular reference to the construction of an improved cushion element for the inner tube of a pneumatic tire.

The principal object of this invention is to provide means whereby the tire casing is automatically released from the wheel rim so that the said casing may slip thereon whenever the inner tube is deflated, and means whereby when the tube is inflated the air will tend to retain the casing tightly wedged against the rim.

Other objects and advantages will be apparent during the course of the following description.

In the accompanying drawings forming a part of this specification and in which like numerals are employed to designate like parts throughout the same, Figure 1 is a vertical cross section of a tire casing and rim having my improved cushion tube therein, and Figure 2 is a view similar to Figure 1 showing the position the tube will assume when the same is deflated.

In my Patent No. 1,636,779 issued July 26th, 1927, a novel type of inner tube has been disclosed, which tube is used in pneumatic tires for the purpose of providing means whereby a motor vehicle having in its tires the described tubes may travel over a road bed without the danger of the rim cutting the tire casing or tube, should the same become deflated. I have endeavored in the present invention to make allowance for the condition of the tube in relation to the casing when the said tube is deflated, for it will be obvious that the effective outer circumference of said tube is less when deflated than when it is inflated. This condition is true because the circumferential length of the tire casing where it contacts the tube in deflated condition does not match up with the cushion and some slip must be provided for between the casing and the tube and the rim to take care of this difference in circumferential length or perimeter.

It is well known that when a tube is placed in a tire casing and thereafter inflated, the inflation of the tube causes the casing to bear against the sides of the rim and to therefore lock the casing to the rim. The present invention contemplates means for unlocking the casing from the rim and at the same time the provision of means whereby a rim will be supported above the road surface in such a manner that the tire casing will not become damaged and at the same time the provision of means whereby the unlocking of the casing permits the same to move relative to the rim.

There are various ways in which the casing may be automatically released from the wheel rim so that it may slip thereon and in the accompanying drawing I have endeavored to show one of the preferred embodiments of my invention, wherein the numeral 5 designates any standard form of rim having outstanding sides as shown at 6 and 7, while the numeral 8 designates an ordinary tire casing of standard construction. Within this casing I place a tube 9 which has secured thereto a cushioned element 11. This cushioned element may be made either cured to the tube or formed integral therewith without departing from the spirit of the invention. It will be noted that the cushion 11 is provided with openings 12 extending horizontally therethrough, which openings extend entirely around the cushion. These openings serve to give the cushion added resiliency and also serve to lighten its weight. In the bottom of the cushion is formed a chamber 13 which chamber is connected to the air space 14 of the tube by channels 16 and 17. Wings 18 and 19 are provided for further securing the cushion to the tube. These wings swingably move laterally outward with the adjacent portions of the tube when the tube is inflated and when the air under pressure in the tube acts directly against the wings to so move the same, and being always separated throughout their length by intervening spaces from the sides of the cushion, the said wings function, when the tube is deflated, to prevent the tube from buckling between the casing and cushion— i. e., collapsing against the sides of the cushion.

The operation of my tube is as follows:—

When the tube is inflated as shown in Figure 1, air from the space 14 passes through the channels 16 and 17 into the chamber 13 and expands the bottom of the cushion as shown in this figure. This causes a stretching of the rubber at the point A and forces the sides of the casing 8 into engagement with the upstanding sides 6 and 7 of the rim 5. When the air in the tube is released as by a puncture or blowout, the air in the chamber 13 escapes through the channels 16 and 17, the rubber at the point A contracts and draws the cushion into the position shown in Figure 2, which action releases the pressure against the sides of the casing. It is of course understood that the tire valve which enters the cushion 11 anchors the cushion to the rim thereby preventing movement of the cushion relative to the rim.

Assuming that the tube is in use under running conditions, the circumference of the cushion is of less length than the circumference of the casing and as the circumference of the cushion will be bearing upon the interior of the tube which in turn bears upon the interior of the casing, it is obvious that a differential action must take place in order to prevent the casing from buckling under running deflated conditions. Consequently by releasing the casing from the rim, the rotation of the wheel in a given direction will drive the cushion and tube in the same direction while the tire casing will slip upon the rim in a direction opposite to its rotation. In other words as applicant's tube provides a substitute bearing surface it follows that in order to prevent mutilation of the casing when the tire is being run deflated, the casing must be allowed to rotate on the wheel in such a manner as to compensate for this difference in circumference. This action may be compared to that of a track laying tractor, applicant's cushion representing the driving sprocket of the tractor and the casing the track thereof.

It will thus be seen that by providing means for releasing the casing from the rim, I have accomplished the objects above set forth.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:—

In a tire structure of the type in which a casing is associated with an inner tube in the casing and is also associated with a rim, an inner tube having an interior cushion adjacent to the rim portion of the tube and projecting toward the tube perimeter; said tube being of even thickness apart from the cushion, and said cushion having in its base portion a normally contracted chamber in communication through duct means in the cushion with the interior of the tube, whereby said chamber and base portion are expansible by air under pressure in the tube.

In testimony whereof I affix my signature.

FREDERICK W. KRONE.